United States Patent [19]

Pelchat et al.

[11] 4,220,923

[45] Sep. 2, 1980

[54] ADAPTIVE INTERFERENCE REDUCTION SYSTEM FOR CROSSTALK CANCELLATION IN A DUAL POLARIZATION SYSTEM

[75] Inventors: Guy M. Pelchat, Indialantic; Charles A. Baird, Palm Bay, both of Fla.

[73] Assignee: Harris Corporation, Cleveland, Ohio

[21] Appl. No.: 891,336

[22] Filed: Mar. 29, 1978

[51] Int. Cl.² .............................................. H04B 1/10
[52] U.S. Cl. ................................. 455/295; 324/57 N; 333/18; 333/166; 455/63; 375/58; 375/101; 328/167
[58] Field of Search ...................... 325/65, 472, 60, 62, 325/63, 42, 367, 371, 476, 477, 304, 1, 3, 4, 56, 363; 179/15 BP, 15 AN, 15 BC; 333/18, 28 R, 70 T, 21 A; 328/162, 165, 167; 343/100 PE, 200; 324/57 N, 57 H, 57 DE

[56] References Cited

U.S. PATENT DOCUMENTS

| | | | |
|---|---|---|---|
| 3,735,266 | 5/1973 | Amitay | 325/56 X |
| 3,963,990 | 6/1976 | DiFonzo | 325/476 |
| 3,986,123 | 10/1976 | Tirró | 343/200 |
| 4,027,105 | 5/1977 | Kannowade | 325/60 |
| 4,112,370 | 9/1978 | Monsen | 325/40 |

OTHER PUBLICATIONS

Cooper, C. P., "Methods of Adaptive Cancellation for Dual Polarization Satellite Systems," Marconi Review, vol. 39, No. 200, pp. 1-24, First Quarter 1976.
Kannowade, H., "An Automatic Control System for Compensating Cross-Polarization Coupling in Frequency Re-Use Communication Systems," IEEE Transactions on Communication, vol. COM-24, No. 9, pp. 986-999, Sep. 1976.

*Primary Examiner*—Robert L. Griffin
*Assistant Examiner*—Alexander Gerasimow
*Attorney, Agent, or Firm*—Craig & Antonelli

[57] ABSTRACT

An adaptive interference reduction system for removing cross talk from a dual polarization system comprising a first adjustable filter for varying the phase and the weight of a first input signal, a second adjustable filter for varying the phase and the weight of a second input signal, a first adder for adding this first input signal and the weighted and phase adjusted output from the second adjustable filter, a second adder for adding the second input signal and the weighted and phase adjusted output from the first adjustable filter, a first noise-to-signal measuring device for generating a signal proportional to the noise-to-signal ratio in the output signal from the first adder, a second noise-to-signal measuring device for generating a signal proportional to the noise-to-signal ratio in the output signal from the second adder, and a dither-type control logic for dithering in-phase and quadrature square-waves in accordance with the signals generated by the first and second noise-to-signal measuring devices to control the first and second adjustable filters. This system is further characterized in that the first and second noise-to-signal measuring devices comprise a slow response control circuit for maintaining the average value of the input signal from the adder at a reference value, and means for filtering this averaged value and detecting the power fluctuations remaining in the signal and generating a signal proportional to these fluctuations. Additionally, the first and second adjustable filters may be structured to have transfer functions across a predetermined bandwidth of $W_0[1+W_1\omega+W_2\omega^2]$ or $W_0[1+W_1\omega+W_2\omega^2+W_3\omega^3]$, where $W_0$, $W_1$, $W_2$ and $W_3$ are signal weights and $\omega$ represents the frequency variation of the input signal from its carrier.

36 Claims, 10 Drawing Figures

ADAPTIVE INTERFERENCE REDUCTION SYSTEM FOR CROSSTALK CANCELLATION IN A DUAL POLARIZATION SYSTEM

The U.S. Government has rights in this invention pursuant to contract No. F30602-76-C-0041 awarded by the Department of the Air Force.

BACKGROUND OF THE INVENTION

1. Field of the Invention

This invention relates to information transmission systems, and more particularly, to arrangements for reducing cross talk in transmission systems in which two or more cross-polarized information channels are employed.

2. Description of the Prior Art

A crowding of the frequency spectrum in electromagnetic transmission systems has lead to an extremely limited availability of channels for radio and satellite communications. One technique for increasing the communicating capacity of a system is to utilize multiple polarizations for a given frequency. In principle, if the polarization discrimination in a system is sufficiently precise, the same frequency-band can be shared by various cross-polarization modes of transmission and the capacity of the system can be substantially increased.

However, certain problems arise when utilizing multiple linearly polarized waves which must be overcome if satisfactory system operation is to be achieved. These problems center around the transmission channel and its effect on the multiple transmitted linearly polarized waves. In particular, after propagation through a transmission channel, the received polarizations are rarely "pure" (i.e., separated). This cross-polarization cross talk is caused by various sources such as rain, nonperfect antennas (especially when viewed off axis), ionospheric propagation, and the Faraday effect. The above-listed causes will essentially convert linearly (as well as circularly) polarized waves into elliptically polarized waves having arbitrary orientations. Moreover, it should be noted that the effects of these causes of cross-polarization vary in time.

Since the individual linearly polarized waves, after conversion to elliptically polarized waves, no longer have their original polarizations, they cannot be properly detected by the receivers of the respective system in which they are propagating without also detecting the cross-coupled signals from adjacent polarizations, i.e., cross talk. Thus, when such a multiple polarization technique is employed, it is required that such unwanted cross talk induced between the polarizations during transmission and reception of information signals be held at or below an acceptable level in order to realize the full potential of the multiple polarization system. This reduction can be accomplished by means of a cross-polarization cancellation network.

OBJECTS OF THE INVENTION

An object of the present invention is to adaptively filter cross talk from a plurality of transmission channels.

A further object of the present invention is to automatically control individual adjustable filters set in each of a plurality of channels and used for adaptive cross-talk reduction between those channels in accordance with the fluctuation of the individual channel power level over the average power level for that channel.

A still further object of the present invention is to adaptively filter cross talk from a plurality of channels with the filter having a transfer function of either $W_0[1+W_1\omega+W_2\omega^2]$ or $W_0[1+W_1\omega+W_2\omega^2+W_3\omega^3]$.

These and further objects, features and advantages of the present invention will become more obvious from the following description when taken in connection with the accompanying drawings which show, for purposes of illustration only, several embodiments in accordance with the present invention.

SUMMARY OF THE INVENTION

In order to achieve the foregoing objects, the present invention sets forth an adaptive correction network for decoupling at least first and second signals and including first and second automatically controlled adjustable filters for subtracting cross-coupling components in the first and second signals. The automatic control of these adjustable filters is obtained by measuring a noise-to-signal ratio in the first and second signal lines and applying these noise ratios to a control circuit which generates control signals in accordance with these noise ratios to control the first and second adjustable filters.

In one embodiment of this invention, these noise-to-signal measuring devices are characterized in that they include a slow response circuit for maintaining the average value of the input signal at approximately a reference value, and a circuit for filtering this average value and detecting the power fluctuations remaining in this filtered signal and generating a signal proportional thereto. In another embodiment of the invention, the adjustable filters are characterized in that they have a transfer function of either $W_0[1+W_1\omega+W_2\omega^2]$ or $W_0[1+W_1\omega+W_2\omega^2+W_3\omega^3]$.

DETAILED DESCRIPTION OF THE PREFERRED EMBODIMENTS

Figure 1:
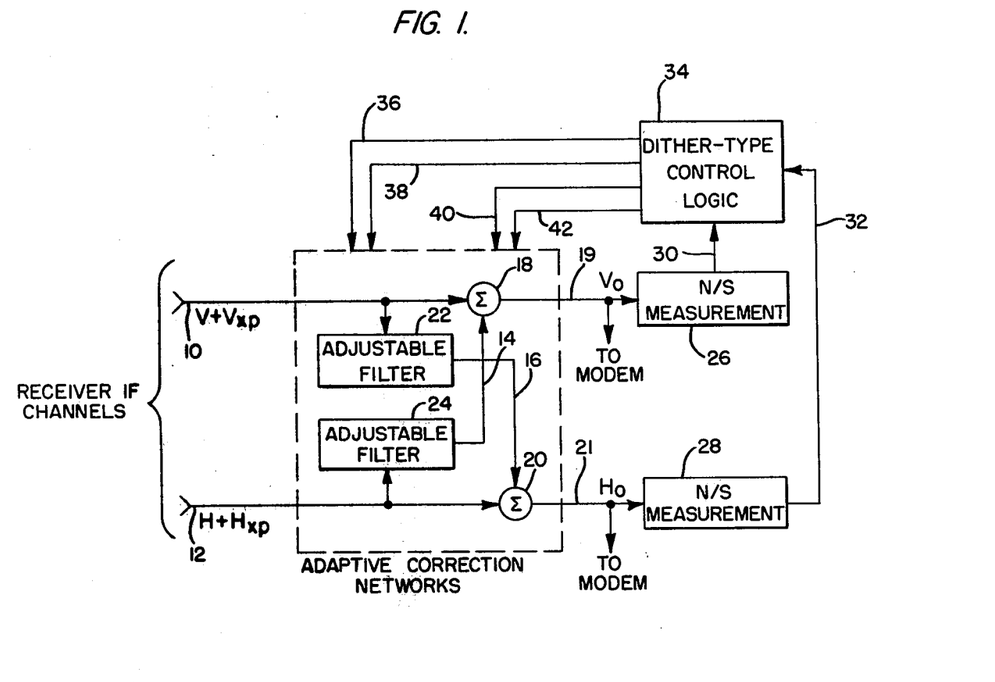
FIG. 1 is a schematic block diagram of the overall adaptive filtering network utilized in the present invention.

Referring to FIG. 1, there is shown a block diagram for an adaptive interference reduction network for removing the cross talk from a multiple polarization transmission system. By way of example, this system will be explained in the context of a dual polarization system wherein two linearly polarized signals polarized orthogonally with respect to each other are transmitted in the same frequency bandwidth by a transmitting station. A receiving station will receive electromagnetic energy transmitted in the above-noted frequency band and will separate signals polarized in a predetermined reference direction from signals polarized in a reference direction orthogonal to the predetermined reference direction in the conventional manner. These two separated signals will be labeled the vertical signal V and the horizontal signal H. The lines 10 and 12 in FIG. 1 contain the V and the H signals, respectively, from the receiver IF channels. The V signal will also include a $V_{xp}$ signal representative of the cross-coupled signal from the horizontal line 12 and a signal $N_v$ representative of the thermal noise in the line 10. Likewise, the signal in line 12 will include the H signal plus a cross-coupled component $H_{xp}$ from the vertical signal line 10 and a thermal noise component $N_h$.

Referring first to the vertical signal on line 10, that signal is applied to one terminal of an adder 18. A portion of the signal on the horizontal line 12 is weighted and phase shifted in an adjustable filter 24 and then applied to a second terminal of the adder 18 by means of line 14. When the signal on line 14 has been properly weighted and phase shifted by the adjustable filter 24, then it will approximate the negative of the cross-coupled component $V_{xp}$ from the line 12. Thus, when the signal from the line 10 and the signal from the line 14 are added in the adder 18, the resultant signal output from the adder 18 should approximate the pure vertically polarized signal V. This signal V is then applied on line 19 to a MODEM.

In order to effect control of the adjustable filter 24, the V signal on line 19 is also applied to a noise-to-signal measuring circuit 26. The output signal on line 30 from this noise-to-signal measuring circuit will be proportional to the amount of cross talk remaining in the vertical signal. This output signal on line 30 will then be applied to a control logic 34 which operates to automatically set the adjustable filter 24 by means of the lines 36 and 38 to maximize the signal-to-noise ratio.

Likewise, the horizontal signal H on line 12 is applied to one input of an adder 20 while the vertical signal on line 10 is weighted and phase shifted by an adjustable filter 22 and applied to a second input of the adder 20 by means of the line 16. The output on line 16 will again approximate the negative of the vertical cross-coupling component $H_{xp}$ on line 12 when the filter 22 is properly adjusted. The output signal from the adder 20 is then applied on line 21 to a MODEM and to a noise-to-signal measuring circuit 28. The output from this noise measuring circuit 28 is applied by means of line 32 to the control logic 34 which operates via the lines 40 and 42 to automatically set the adjustable filter 22 to couple a properly weighted signal from the line 10 to the line 12.

Figure 2:
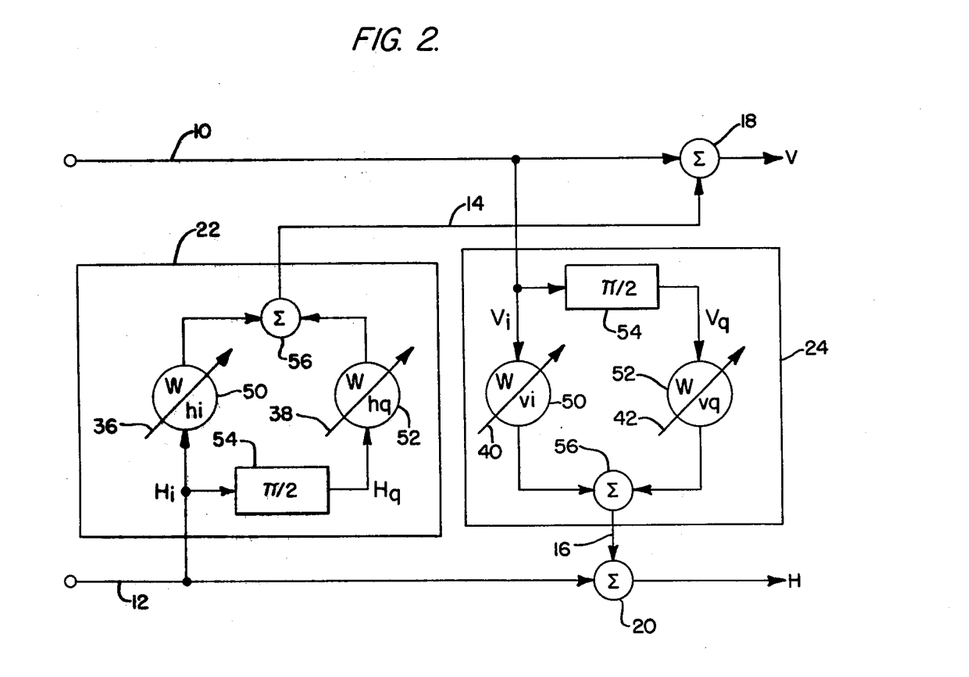
FIG. 2 is a schematic block diagram of one embodiment of the adjustable filters 22 and 24 shown in FIG. 1.

The adjustable filters 22 and 24 will now be described in more detail. An elementary form for these adjustable filters is shown in FIG. 2. Filter 22 is shown to include a variable gain device 50 for varying the amplitude of the horizontal signal on line 12 in accordance with the control input 36 from the control logic 34. A second variable gain device 52 operates to vary the amplitude of a component of the horizontal signal on line 12 which has been shifted in phase by 90° by the phase shifter 54. The variable gain device 52 is controlled by a control line 38 from the control logic 34. The outputs from these variable gain devices 50 and 52 are added in an adder 56. The output from the adder 56 is then applied on line 14 to the adder 18 to compensate for the cross-coupled component $V_{xp}$ in the line 10. This technique of separately weighting the in-phase component and the quadrature component of the horizontal signal on line 12 in accordance with control signals and then combining these individually weighted components in the adder 56 provides accurate control of the amplitude and the phase of the compensation signal applied on line 14. Likewise, for the adjustable filter 24 there is included a variable gain device 50 for the in-phase component of the signal on line 10 and a variable gain device 52 for the quadrature phase component of the signal on line 10 obtained via a 90° phase shifter block 54. These variable gain devices 50 and 52 are controlled by the respective control lines 40 and 42 from the control logic 34. Again, after the in-phase and the quadrature components have been individually weighted in the variable gain devices 50 and 52, these signals are recombined in the adder 56 and applied to the adder 20 via the line 16. Adjustable filters with the configuration shown in FIG. 2 weight the in-phase and the quadrature components of the signal with variable weights which are nominally constant across the frequency band of interest.

Figure 4:
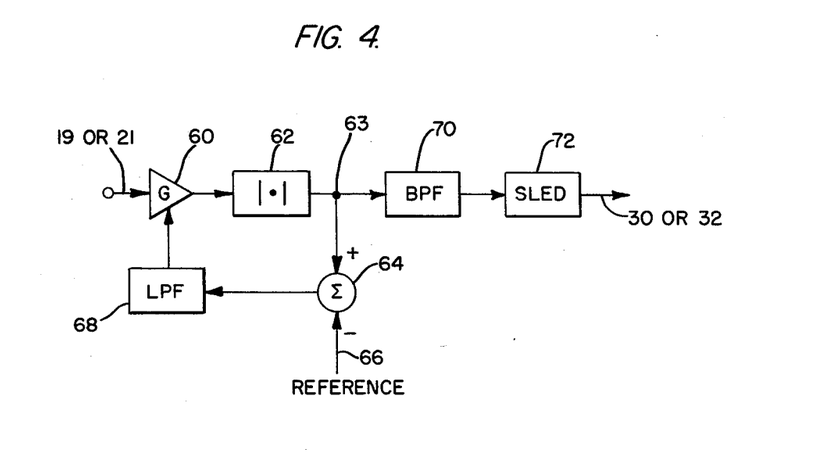
FIG. 4 is a schematic block diagram of N/S measurement circuit 26 shown in FIG. 1.

The noise-to-signal measurement circuit 26 is shown in FIG. 4. Since the overall network is designed to operate with a nominally constant envelope input signal, channel cross talk can be measured by measuring the power in the envelope fluctuations above the nominally constant reference value. Envelope fluctuations can be tolerated, as long as the interference produces envelope variations measurable thereover. In order to effect the foregoing measurement, the noise-to-signal measurement block 26 includes an automatic gain control feedback loop comprising a variable gain amplifier 60 and a magnitude detector 62 which generates a D.C. signal proportional to the amplitude of the envelope of the output signal from the variable gain amplifier 60. The output from the magnitude detector 62 is applied to the plus input of an adder circuit 64. A reference voltage proportional to a predetermined reference envelope amplitude is applied via the line 66 to a negative input of the adder 64. The adder 64 subtracts this reference voltage on the line 66 from the D.C. voltage output from the magnitude detector 62 and applies a signal proportional to this difference through a low-pass filter 68 to the control input of the variable gain amplifier 60. The circuit components for this feedback loop are chosen such that that loop has a very slow reaction time to voltage variations at the point 63. This slow reaction time can be obtained in a number of ways. For example, the low-pass filter 68 can be chosen to have a very narrow band, or the variable gain amplifier 60 can be set to have a very low gain. Thus, this automatic gain control loop will operate to keep the average value of the signal at the point 63 at a reference voltage, but because of its slow reaction time, it will not affect fast voltage variations of the type caused by cross talk. By this means, gradual fluctuations in the desired signal level will not affect the interference or cross-talk measurement.

The output from the magnitude detector 62 is also applied to a bandpass filter 70 which operates to pass only signals in the bandwidth where cross-talk signals will occur. More specifically, this bandpass filter is chosen to remove the D.C. terms in the signal due to the information signal components and to remove voltage fluctuations not due to cross talk. This filtered signal is then applied to a square-law envelope detector 72 which measures the average power level of the remaining noise terms and applies a D.C. signal proportional to this average power level to its output (line 30 or 32).

Figure 5:
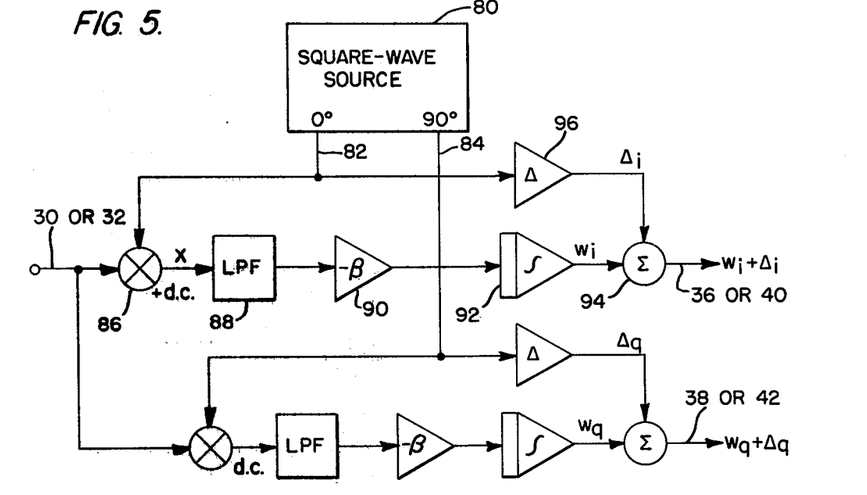
FIG. 5 is a schematic block diagram of the control logic 34 shown in FIG. 1.

Referring now to FIG. 5, there is disclosed a block diagram of the control logic 34. When utilizing an adjustable filter of the type shown in FIG. 2, a problem arises in determining whether to vary the in-phase or the quadrature component of the signal in order to reduce the noise in that particular channel. For example, if the weights of both of the variable gain devices 50 and 52 of filter 24 are increased and the noise signal on line 30 decreases, it will not be clear whether the cause of this decrease was the variation of the variable gain device 50 or the variation of the variable gain device 52 or a combination thereof. In order to remedy this problem, the control signals 36 and 40 for the in-phase variable gain devices 50 are controlled or dithered in accordance with a zero phase square-wave signal while the variable gain devices 52 for the quadrature component are controlled or dithered by a quadrature or 90° square-wave signal. In this regard, a square-wave source 80 is provided for generating square-waves with phases of 0° and 90°. The 0° square-wave is applied on line 82 to one input of a mixer or phase comparator 86. The noise signal applied on lines 30 or 32 is composed of two square-wave signals phased at 0° and 90°, respectively, because the control signals for the in-phase and quadrature phase components of the signal from the adjustable filter are 0° and 90° square-waves, respectively. Thus, when the 0° square-wave representative of the noise variation caused by the variation of the in-phase variable gain device 50 is correlated with the 0° constant amplitude square-wave from the output line 82, a D.C. voltage will be obtained at the output of the phase comparator 86 proportional to the power in the noise fluctuation.

The correlation of the 0° square-wave on line 82 with a noise signal varying with a square-wave phased at 90° with respect to the 0° square-wave on the line 82 will result in a square-wave output at double the original input square-wave frequency. This doubled square-wave frequency will be filtered out by the low-pass filter 88. The D.C. signal resulting from the correlation of in-phase square-waves will be averaged by the low-pass filter 88 to approximate the noise signal gradient. This D.C. signal is then applied through an inverting amplifier 90 and an integrating amplifier 92 to one input of an adder 94. The 0° squarewave from the output line 82 is applied via an amplifier 96 to another input of the adder 94. The adder 94 adds this D.C. signal and the 0° square-wave and applies this added signal to the control line 36 or the control line 40 for the variable gain devices 50. With respect to the integrating amplifier 92, since the cross-talk noise is a quadratic function of the weights of the variable gain devices, the best weight settings can generally be found by integrating the D.C. signal. This integrated D.C. output will be maintained until the next input to the integrating amplifier. The amplifier 90 is utilized to control the loop bandwidth (i.e., dynamic response).

Figure 6:
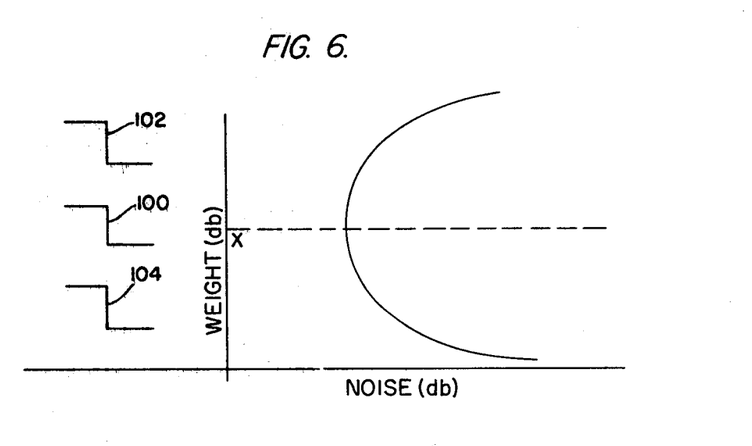
FIG. 6 is a graphical representation of the weight vs. noise characteristic for variations of the 0° weight in an adjustable filter.
Figure 7:
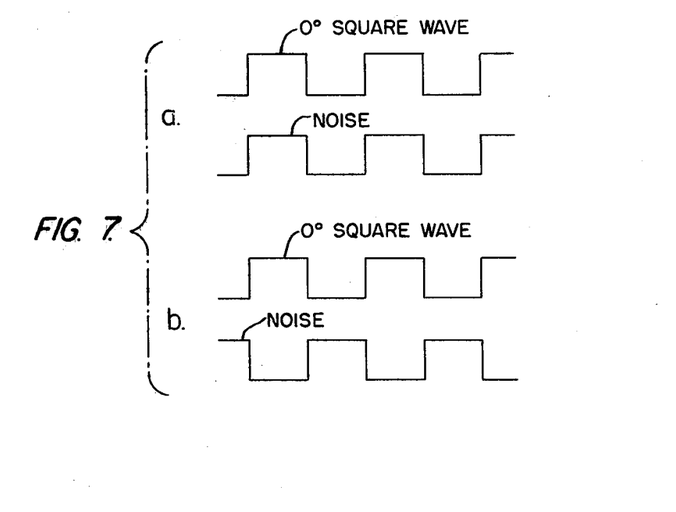
FIGS. 7a and 7b are graphical representations of the in-phase and out-of-phase square-wave inputs to mixer 86.

As noted above, the cross talk in each channel generally takes the form of a quadratic function of the weight for that particular channel. By way of example, the cross talk or noise quadratic function is shown in FIG. 6 on a weight versus noise scale for the in-phase or 0° channel. The weight which will obtain the minimum noise is represented as point x. The purpose of the control logic of FIG. 5 is to add a particular bias voltage $w_i$ to the square-wave signal such that the high and the low voltage of the square-wave signal straddle the optimum weight voltage x as shown by a portion of the square-wave 100 in FIG. 6. When the 0° square-wave from the source 80 is biased too high, as shown by the square-wave 102 in FIG. 6, then the high portion of the square-wave will coincide with a high noise voltage while the low voltage portion of the square-wave will coincide with a low-noise signal. The foregoing in-phase relationship of the 0° square-wave and the noise signal is shown in FIG. 7a. Thus, in operation, the 0° square-wave will be correlated with this in-phase noise signal to obtain a positive D.C. output. This D.C. output voltage will be inverted by the inverting amplifier 90 and applied through the integrating amplifier 92 to the adder 94. Thus, a negative D.C. voltage will be added to bias the 0° square-wave from the line 82 to a lower voltage. The biasing of the 0° square-wave will continue in this manner until this square-wave either straddles the weight x for minimum noise, or until the 0° square-wave is biased below the weight x required for minimum noise.

If the 0° square-wave is biased below the weight required for minimum noise, as shown by the square-wave 104 in FIG. 6, then the high-voltage portion of the 0° square-wave will coincide with the low-noise output voltage, while the low-voltage portion of the 0° square-wave will coincide with a high-noise voltage output. This out-of-phase relationship is represented by FIG. 7b. In operation, the 0° square-wave will be correlated with this out-of-phase noise voltage and will produce a negative D.C. voltage. This negative D.C. voltage will be inverted by the inverting amplifier 90 and applied via the integrating amplifier 92 to the adder 94. Thus, a positive D.C. voltage will be added to the 0° square-wave from line 82 to raise its bias voltage. This bias shifting operation will continue until the 0° square-wave straddles the optimum weight point x or is biased above that point. The foregoing biasing operation is referred to as dithering.

In the same manner as shown for the 0° square-wave, the bias point for the quadrature or 90° square-wave is controlled or dithered to cause the 90° square-wave to straddle the minimum noise weight.

It should be noted that a control logic circuit as shown in FIG. 5 is required for each adjustable filter in the system. Thus, for the system shown in FIG. 1, two control logics of the type shown in FIG. 5 will be required. The number of dither-type control logics required in a system may be reduced by appropriately time-sharing this dither-type control logic among a plurality of adjustable filters.

Figure 3:
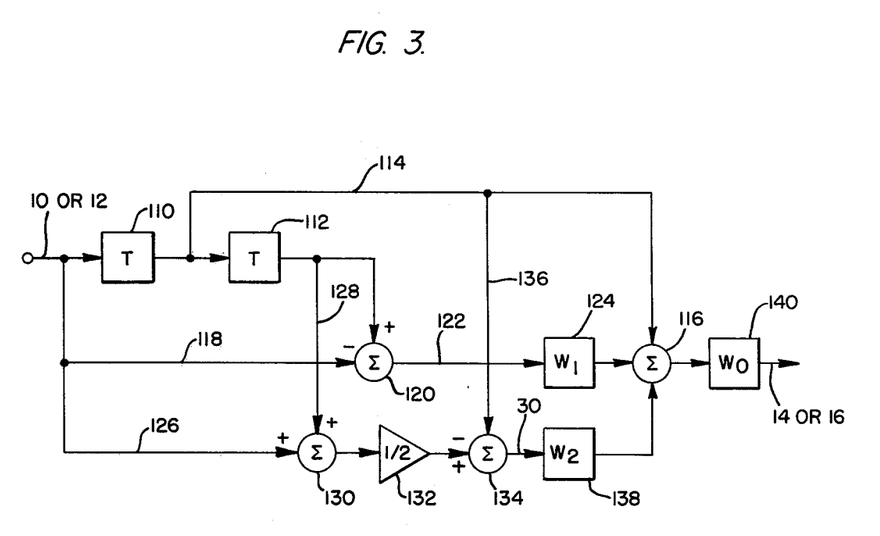
FIG. 3 is a schematic block diagram of another embodiment of the adjustable filters 22 and 24 shown in FIG. 1 in accordance with the present invention.

As noted above, the weight provided by the adjustable filter shown in FIG. 2 is nominally constant across the frequency band of interest. A more complex adjustable filter is shown in FIG. 3. This filter comprises a unique modification of a standard tapped delay line and has a transfer function $W(\omega) = W_0[1 + W_1\omega + W_2\omega^2]$. With a filter of this design, it is possible to separately adjust the constant, linear and quadratic magnitude and phase terms in $\omega$ across the bandwidth of interest. This design essentially gives uncoupled control of these terms and makes possible the relation of the adapted weight settings to the specific differential dispersion in the two channels.

Figure 9A:
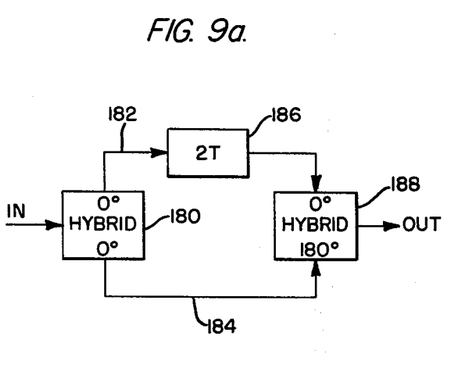
FIG. 9a is a schematic block diagram of the blocks B ($\omega$) shown in FIG. 8.
Figure 9B:
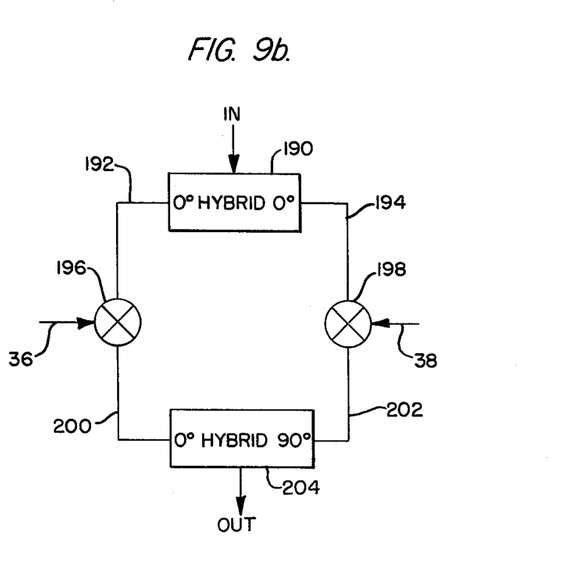
FIG. 9b is a schematic block diagram of the weighting blocks W shown in FIG. 8, or FIGS. 2 and 3.

Referring now to FIG. 3, the weights $W_0$, $W_1$ and $W_2$ are structured like the adjustable filter shown in FIG. 2 or the adjustable weight of FIG. 9b. It should be noted that the frequency $\omega$ is measured from the carrier frequency.

In order to produce constant, linear and quadratic weightings, two delay elements 110 and 112 are provided to produce echoes to thereby approximate a filter. The constant weight term is obtained by delaying the input signal by a delay time $\tau$ in a delay element 110 and applying it via line 114 directly to an adder 116. The constant weight transfer characteristic will have the form of $e^{-j\omega\tau}$. The linear weight term (represented by a signal with a voltage gain which is a linear function of $\omega$, the frequency deviation from the carrier frequency) is obtained by subtracting the input signal on line 118 from a portion of the input signal which has been twice delayed by the delay time $\tau$ in the delay elements 110 and 112. This subtraction is obtained by applying the input signal on the line 118 to the negative terminal of an adder 120 while applying the twice delayed signal to the positive terminal of the adder 120. The signal resulting from this subtraction has the form $1-e^{-2j\omega\tau}$ which may be manipulated using identities to equal $2je^{-j\omega\tau}$ (sin $\omega\tau$). A signal with this form will be linear in $\omega\tau$ when $\omega\tau$ is chosen to be small compared to $\pi/2$.

This linear signal is applied on line 122 to a second terminal of the adder 116 via the magnitude and phase weighting device 124.

The quadrature weight signal (the voltage gain of the signal is a quadratic function of the frequency $\omega$) is obtained by adding the input signal on line 126 to the input signal on line 128 which has been twice delayed by the delay time $\tau$ in the delay elements 110 and 112. This addition is performed in an adder 130. The output signal from the adder 130 has the form $2je^{-j\omega\tau}$ (cos $\omega\tau$). This output signal from the adder 130 is applied via the amplifier 132 to the positive input of an adder 134. The input signal delayed by the delay time $\tau$ in the delay device 110 is applied via the line 136 to the negative input of the adder 134. The adder 134 operates to subtract these two signals to obtain a signal of the form $e^{-j\omega\tau}$ (cos $\omega\tau - 1$). This signal will have a quadratic variation with the frequency $\omega$ when the term $\omega\tau$ is chosen to be small compared to $\pi/2$. The output from the adder 134 is applied through the phase and magnitude weighting device 138 to a third input of the adder 116. The sum of these constant, linear, and quadratic variations with the frequency $\omega$ are applied to a third magnitude and phase weighting device 140. The output from the device 140 is then applied on either the line 14 or 16 in FIG. 1 and will have the form $W(\omega) = W_0[1 + W_1\omega + W_2\omega^2]$.

It should be reiterated that this circuit permits the uncoupled control of the constant, linear, and quadratic terms thereby providing a substantial advantage over prior art adjustable filters.

Figure 8:
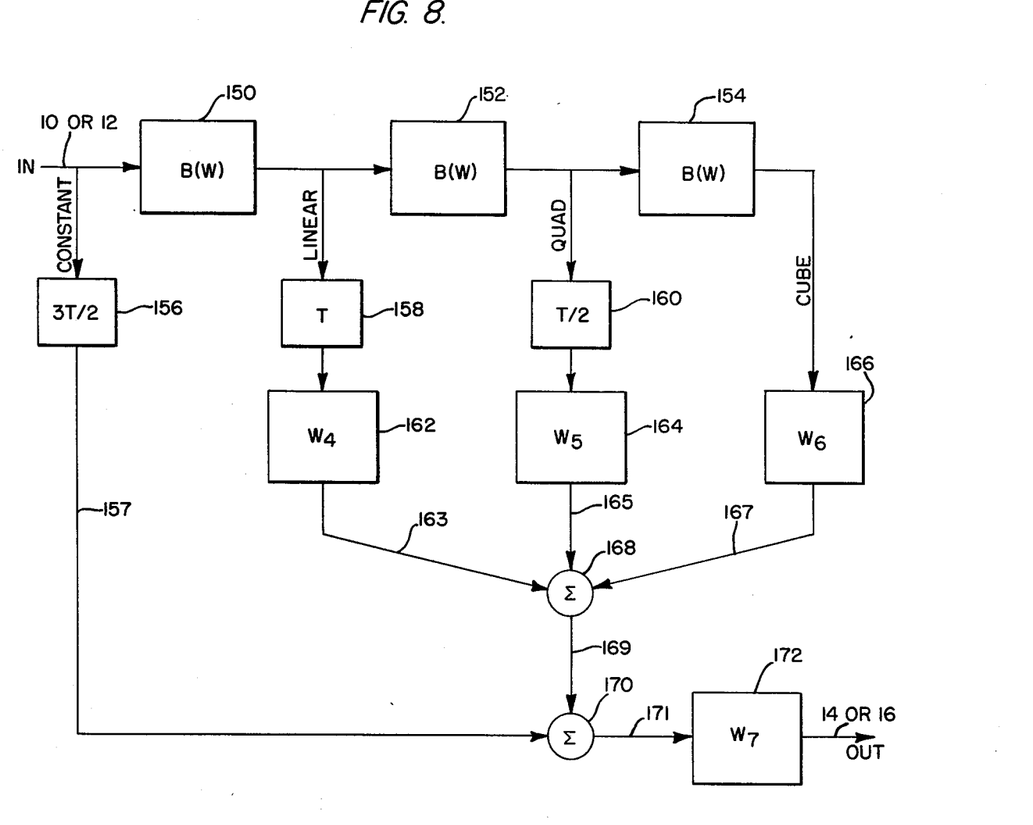
FIG. 8 is a schematic block diagram of a third embodiment of the adjustable filters 22 and 24 shown in FIG. 1.

A third embodiment of the adjustable filters 22 and 24 shown in FIG. 1 is shown in FIG. 8. This filter has a transfer function $W(\omega) = W_7[1 + W_4\omega + W_5\omega^2 + W_6\omega^3]$. With a filter of this design, it is possible to separately adjust the constant, linear, quadratic and cubic magnitude and phase terms in $\omega$ across the bandwidth of interest. This design essentially provides uncoupled control of these terms and makes possible the relation of the adapted weight settings to the specific differential dispersion in the two channels in a manner similar to that of the filter shown in FIG. 3.

Referring now to FIG. 8, the element blocks $B(\omega)$ labeled 150, 152, and 154 are designed in order to obtain a signal proportional to $\omega\tau$. FIG. 9a is a schematic block diagram of one circuit configuration which may be utilized in order to obtain the function $\omega\tau$. More specifically, an input signal is applied to a standard hybrid circuit 180 which operates to provide two in-phase signals on lines 182 and 184. The signal on line 182 is applied to a delay circuit 186 which operates to add a delay of $2\tau$ to the signal. The output signal from the delay element 186 and the signal on line 184 are applied to the difference inputs (the 0° input and the 180° input) of a hybrid 188. The hybrid 188 subtracts these two inputs and applies the difference signal as its output. In view of the foregoing, the function of the block $B(\omega) = e^{j\omega 2\tau} - 1 = 2je^{j\omega\tau}$ sin $\omega\tau$. This function approximates $\omega\tau$ when $\omega\tau$ is chosen to be small compared to $\pi/2$.

The weight blocks $W_4$, $W_5$, $W_6$ and $W_7$ are structured such that the weight and the phase of an incoming signal may be independently adjusted. FIG. 9b is a schematic block diagram of one circuit embodiment which may be utilized to obtain this weight and phase control. More specifically, a signal is applied on an input line to a conventional hybrid 190. The hybrid 190 operates to split the signal and provide two in-phase output signals on the lines 192 and 194, respectively. The signal on line 192 is mixed with the in-phase control signal from, by way of example, line 36 in the mixer 196. Likewise, the signal on line 194 is mixed with the quadrature control signal from, by way of example, line 38 in the mixer 198. The output signals from the mixers 196 and 198 are applied via the lines 200 and 202, respectively, to the quadrature inputs (the 0° input and the 90° input) of a quadrature hybrid 204. The quadrature hybrid 204 operates to shift the signal at its 90° input by 90° and then add this shifted signal input to the signal applied to its 0° input. This added signal is then applied as the output of the hybrid. Thus, by means of the mixers 196 and 198 both the weight and the phase of the signal may be controlled. It should be noted that this circuit is similar in effect to the filter embodiments shown in FIG. 2. It should also be noted that approximately the same type of weighting and phase control can be obtained by utilizing PIN diode attenuators.

Referring again to FIG. 8, an input is applied either from line 10 or line 12 through a $3\tau/2$ delay block 156 to one input of an adder 170 via the line 157. (It should be noted that this delay block 156 and the delay blocks 158 and 160 discussed below are required to compensate for the processing delays caused by the $B(\omega)$ blocks. By way of example, $\tau$ may be chosen as $\lambda/2$ at a 70 MHz frequency). The signal on line 157 is equivalent to a constant signal. This input signal is also applied to a $B(\omega)$ block 150 which operates to provide an output signal $\omega\tau$ when $\omega$ and $\tau$ are properly chosen, as noted above. The output signal from the block 150 is applied via the $\tau$ delay block 158, the weight block 162, and the line 163 to one input of an adder 168. This signal on line 163 is a signal with a voltage gain which is a linear function of $\omega$. The output signal $\omega\tau$ from the block 150 is also applied to the $B(\omega)$ block 152 which operates on the signal in a fashion identical to that of block 150 such that a signal proportional to $(\omega\tau)^2$ is obtained at its output. This output signal $(\omega\tau)^2$ is applied via the $\tau/2$ delay block 160, the $W_5$ weight block 164, and the line 165 to a second input of the adder 168. The signal on line 165 thus has a voltage gain which is a quadratic function of the frequency $\omega$. The output signal $(\omega\tau)^2$ from the block 152 is also applied to the $B(\omega)$ blocks to provide an output signal $(\omega\tau)^3$. This output signal $(\omega\tau)^3$ is applied via the $W_6$ weight block 166 and the line 167 to a third input of the adder 168. The signal on line 167 has a voltage gain which is a cubic function of the frequency $\omega$. The linear signal on line 163, the quadratic signal on line 165, and the cubic signal on line 167 are added in the adder 168 and applied via the line 169 to a second input of the adder 170 wherein they are added with the constant signal from line 157. The output signal from the adder 170 is applied via the line 171 to a $W_7$ weight block 172 which provides the output signal $W(\omega) = W_7[1 + W_4\omega + W_5\omega^2 + W_6\omega^3]$ which is then applied as a compensation signal on either line 14 or line 16 in FIG. 1.

It should be reiterated at this point that the circuit of FIG. 8 permits the uncoupled control of the constant, linear, quadratic, and cubic frequency terms of the compensation signal thereby providing a substantial advantage over the prior art adjustable filters.

It should be noted that the present decoupling system may be utilized with either orthogonal linear polarizations or circular polarizations.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. An adaptive correction network for decoupling a first and second signals comprising:
    a first adjustable filter receiving said first signal and adjusting its weight and phase;
    a second adjustable filter receiving said second signal and adjusting its weight and phase;
    first adder means for adding said first signal and the weighted and phase adjusted output from said second adjustable filter to thereby subtract cross-coupling components from said first signal;
    second adder means for adding said second signal and the weighted and phase adjusted output from said first adjustable filter to thereby subtract cross-coupling components from said second signal;
    first noise-to-signal measuring means for generating a signal proportional to the noise-to-signal ratio in the output signal from said first adder means;
    second noise-to-signal measuring means for generating a signal proportional to the noise-to-signal ratio in the output signal from said second adder means; and
    control means for generating signals in accordance with the signals generated by said first and second noise-to-signal measuring means to control said first and second adjustable filters;
    wherein said first and second noise-to-signal measuring means each comprise:
    a slow response control circuit for maintaining the average value of the input signal from said adder means at approximately a reference value;
    means for filtering said average signal to remove signal components not caused by cross-coupling with another signal; and
    detector means for detecting fluctuations remaining in said signal after filtering and generating a signal proportional to these fluctuations.

2. An adaptive correction network as defined in claim 1, wherein said slow response control circuit comprises an automatic gain control feedback loop set to said reference value.

3. An adaptive correction network as defined in claim 2, wherein said automatic gain control feedback loop comprises:
    a variable gain amplifier for amplifying said adder means input;
    a magnitude detector for detecting the magnitude of the output from said variable gain amplifier and generating a D.C. signal proportional thereto; and
    third adder means for subtracting a reference voltage from the D.C. signal output from said magnitude detector and applying its output to control said variable gain amplifier.

4. An adaptive correction network as defined in claim 1, wherein said detector means comprises a square-law envelope detector.

5. An adaptive correction network for decoupling a first and second signals comprising:
    a first adjustable filter receiving said first signal and adjusting its weight and phase;
    a second adjustable filter receiving said second signal and adjusting its weight and phase;
    first adder means for adding said first signal and the weighted and phase adjusted output from said second adjustable filter to thereby subtract cross-coupling components from said first signal;
    second adder means for adding said second signal and the weighted and phase adjusted output from said first adjustable filter to thereby subtract cross-coupling components from said second signal;
    first noise-to-signal measuring means for generating a signal proportional to the noise-to-signal ratio in the output signal from said first adder means;
    second noise-to-signal measuring means for generating a signal proportional to the noise-to-signal ratio in the output signal from said second adder means; and
    control means for generating signals in accordance with the signals generated by said first and second noise-to-signal measuring means to control said first and second adjustable filters;
    wherein said first and second adjustable filters each comprise:
    first means for generating a signal from an input signal which is constant in magnitude and phase;
    second means for generating from said input signal a signal with magnitude and phase terms which vary linearly with frequency across a predetermined frequency bandwidth, the precise linearity variation with frequency of the magnitude and phase of the generated signal being controlled by control signals from said control means;
    third means for generating from said input signal a signal with magnitude and phase terms which vary quadratically with frequency across said predetermined frequency bandwidth, the precise quadratic variation with frequency of the magnitude and phase of the generated signal being controlled by control signals from said control means;
    third adder means for combining the output signals from said first, second and third means for application to said first or second adder means.

6. An adaptive correction network as defined in claim 5, wherein
- said first means comprises first delay means for delaying said input signal by a predetermined amount and applying its output signal to said third adder means;
- said second means comprises the combination of said first delay means, second delay means for delaying the output from said first delay means by a predetermined amount, and first subtractor means for subtracting the output signal from said second delay means from said input signal and applying this subtracted output signal to said third adder means; and
- said third means comprises the combination of said first and second delay means, fourth adder means for adding the output signal from said second delay means to said signal, and second subtractor means for subtracting the output signal from said first delay means from the output signal from said fourth adder means and applying this subtracted output signal to said third adder means.

7. An adaptive correction network as defined in claim 6, wherein said first and second subtractor means and said third adder means include weighting and phase shifting circuits for varying the weight and the phase of the subtracted signals and the added signal, respectively, in accordance with control signals from said control means.

8. An adaptive correction network as defined in claim 7, wherein said control circuit comprises a dither-type control logic including a square-wave generator for generating square-waves with 0° and 90° phase shifts for use in separating the noise variations on the input signals from said first and second noise-to-signal measuring means caused by the adjustments of said first and second adjustable filters and generating control signals in accordance therewith.

9. A noise measuring device for measuring the cross-coupling components in an automatic decoupling system comprising:
- a slow response control circuit for maintaining the average value of an input signal at approximately a reference value;
- means for filtering said averaged signal to remove signal components not caused by cross-coupling with another signal; and
- detector means for detecting fluctuations remaining in said signal after filtering and generating a signal proportional to these fluctuations.

10. A noise measuring device as defined in claim 9, wherein said slow response control circuit comprises an automatic gain control feedback loop set to said reference value.

11. A noise measuring device as defined in claim 10, wherein said automatic gain control feedback loop comprises:
- a variable gain amplifier for amplifying said input signal;
- a magnitude detector for detecting the magnitude of the output from said variable gain amplifier and generating a D.C. signal proportional thereto; and
- adder means for subtracting a reference voltage from the D.C. signal output from said magnitude detector and applying its output to control said variable gain amplifier.

12. A noise measuring device as defined in claim 9, wherein said detector means comprises a square-law envelope detector.

13. An adjustable filter for use in adaptively removing cross-coupling signal components in a channel under the control of an automatic decoupling system comprising:
- first means for generating from an input signal a signal which is constant in magnitude and phase;
- second means for generating from said input signal a signal with magnitude and phase terms which vary linearly with frequency across a predetermined frequency bandwidth, the precise linearity variation with frequency of the magnitude and phase of the generated signal being controlled by control signals from said automatic decoupling system;
- third means for generating from said input signal a signal with magnitude and phase terms which vary quadratically with frequency across said predetermined frequency bandwidth, the precise quadratic variation with frequency of the magnitude and phase of the generated signal being controlled by control signals from said automatic decoupling system;
- first adder means for combining the output signals from said first, second and third means for application to the channel to be decoupled.

14. An adjustable filter as defined in claim 13, wherein
- said first means comprises first delay means for delaying said input signal by a predetermined amount and applying its output signal to said first adder means;
- said second means comprises the combination of said first delay means, second delay means for delaying the output from said first delay means by a predetermined amount, and first subtractor means for subtracting the output signal from said second delay means from said input signal and applying this subtracted output signal to said first adder means; and
- said third means comprises the combination of said first and second delay means, second adder means for adding the output signal from said second delay means to said input signal, and second subtractor means for subtracting the output signal from said first delay means from the output signal from said second adder means and applying this subtracted output signal to said first adder means.

15. An adjustable filter as defined in claim 14, wherein said first and second subtractor means and said first adder means include weighting and phase shifting circuits for varying the weight and the phase of the subtracted signals and the added signal, respectively, in accordance with control signals from said automatic decoupling system.

16. An adaptive correction network for decoupling a first and second signals comprising:
- a first adjustable filter receiving said first signal and adjusting its weight and phase;
- a second adjustable filter receiving said second signal and adjusting its weight and phase;
- first adder means for adding said first signal and the weighted and phase adjusted output from said second adjustable filter to thereby subtract cross-coupling components from said first signal;
- second adder means for adding said second signal and the weighted and phase adjusted output from said first adjustable filter to thereby subtract cross-coupling components from said second signal;

first noise-to-signal measuring means for generating a signal proportional to the noise-to-signal ratio in the output signal from said first adder means;

second noise-to-signal measuring means for generating a signal proportional to the noise-to-signal ratio in the output signal from said second adder means; and control means for generating signals in accordance with the signals generated by said first and second noise-to-signal measuring means to control said first and second adjustable filters;

wherein said first and second adjustable filters each comprise means for varying an input signal by the function $W_0[1+W_1\omega+W_2\omega^2]$, where $\omega$ is measured from the carrier frequency of the input signal and wherein $W_0$, $W_1$, and $W_2$ are weights controlled by signals from said control means.

17. An adaptive correction network as defined in claim 16, wherein said first and second adjustable filters each comprise:

third adder means;

first delay means for delaying said input signal by a predetermined amount and applying its output to said third adder means;

second delay means for delaying the output signal from said first delay means by a predetermined amount;

first subtractor means for subtracting the output signal from said second delay means from said input signal and applying this subtracted output signal to said third adder means;

fourth adder means for adding the output signal from said second delay means to said input signal; and second subtractor means for subtracting the output signal from said first delay means from the output signal from said fourth adder means and applying this subtracted output signal to said third adder means;

said third adder means adding the output signals from said first delay means, said first subtractor means, and said second subtractor means and applying its output to said first or second adder means.

18. An adaptive correction network as defined in claim 17, wherein said first and second subtractor means and said third adder means include weighting and phase shifting circuits for varying the weight and the phase of the subtracted signals and the added signal, respectively, in accordance with control signals from said control means.

19. An adjustable filter for use in adaptively removing cross-coupling signal components in a channel under the control of an automatic decoupling system comprising:

first adder means;

first delay means for delaying said input signal by a predetermined amount and applying its output to said first adder means;

second delay means for delaying the output signal from said first delay means by a predetermined amount;

first subtractor means for subtracting the output signal from said second delay means from said input signal and applying this subtracted output signal to said first adder means;

second adder means for adding the output signal from said second delay means to said input signal; and second subtractor means for subtracting the output signal from said first delay means from the output signal from said second adder means and applying this subtracted output signal to said first adder means;

said first adder means adding the output signals from said first delay means, said first subtractor means, and said second subtractor means and applying its output to the channel to be decoupled.

20. An adjustable filter as defined in claim 19, wherein said first and second subtractor means and said first adder means include weighting and phase shifting circuits for varying the weight and the phase of the subtracted signals and the added signal, respectively, in accordance with control signals from said automatic decoupling system.

21. An adaptive correction network for decoupling a first and second signals comprising:

a first adjustable filter receiving said first signal and adjusting its weight and phase;

a second adjustable filter receiving said second signal and adjusting its weight and phase;

first adder means for adding said first signal and the weighted and phase adjusted output from said second adjustable filter to thereby subtract cross-coupling components from said first signal;

second adder means for adding said second signal and the weighted and phase adjusted output from said first adjustable filter to thereby subtract cross-coupling components from said second signal;

first noise-to-signal measuring means for generating a signal proportional to the noise-to-signal ratio in the output signal from said first adder means;

second noise-to-signal measuring means for generating a signal proportional to the noise-to-signal ratio in the output signal from said second adder means; and control means for generating signals in accordance with the signals generated by said first and second noise-to-signal measuring means to control said first and second adjustable filters;

wherein said first and second adjustable filters each comprise:

first means for generating a signal from an input signal which is constant in magnitude and phase;

second means for generating from said input signal a signal with magnitude and phase terms which vary linearly with frequency across a predetermined frequency bandwidth, the precise linearity variation with frequency of the magnitude and phase of the generated signal being controlled by control signals from said control means;

third means for generating from said input signal a signal with magnitude and phase terms which vary quadratically with frequency across said predetermined frequency bandwidth, the precise quadratic variation with frequency of the magnitude and phase of the generated signal being controlled by control signals from said control means;

fourth means for generating from said input signal a signal with magnitude and phase terms which vary cubically with frequency across said predetermined frequency bandwidth, the precise cubic variation with frequency of the magnitude and phase of the generated signal being controlled by control signals from said control means; and third adder means for combining the output signals from said first, second, third and fourth means for application to said first or second adder means.

22. An adaptive correction network as defined in claim 21, wherein
said first means comprises means for applying said input signal to said third adder means;
said second means comprises first linearization means for providing an output signal which varies linearly with frequency $\omega$ of said input signal and applying this linear output signal to said third adder means;
said third means comprises the combination of said first linearization means and second linearization means for providing an output signal which varies linearly with the frequency of the output signal from said first linearization means to thereby provide to said third adder means a signal which varies quadratically with the frequency of said input signal;
said fourth means comprises the combination of said first linearization means, said second linearization means, and third linearization means for providing an output signal which varies linearly with the frequency of the output signal from said second linearization means to thereby provide to said third adder means a signal which varies cubically with the frequency of said input signal.

23. An adaptive correction network as defined in claim 22, wherein said linear signal, said quadratic signal, and said cubic signal are each applied to said third adder means through weighting and phase shifting circuits for varying the weights and phases of their respective input signals in accordance with control signals from said control means.

24. An adaptive correction network as defined in claim 23, wherein a weighting and phase shifting circuit is provided in the output line from said third adder means for varying the weight and phase of the output signal from said third adder means in accordance with control signals from said control means.

25. An adaptive correction network as defined in claim 24, wherein said control circuit comprises a dither-type control logic including a square-wave generator for generating square-waves with 0° and 90° phase shifts for use in separating the noise variations on the input signals from said first and second noise-to-signal measuring means caused by the adjustments of said first and second adjustable filters and generating control signals in accordance therewith.

26. An adaptive correction network for decoupling a first and second signals comprising:
a first adjustable filter receiving said first signal and adjusting its weight and phase;
a second adjustable filter receiving said second signal and adjusting its weight and phase;
first adder means for adding said first signal and the weighted and phase adjusted output from said second adjustable filter to thereby subtract cross-coupling components from said first signal;
second adder means for adding said second signal and the weighted and phase adjusted output from said first adjustable filter to thereby subtract cross-coupling components from said second signal;
first noise-to-signal measuring means for generating a signal proportional to the noise-to-signal ratio in the output signal from said first adder means;
second noise-to-signal measuring means for generating a signal proportional to the noise-to-signal ratio in the output signal from said second adder means; and
control means for generating signals in accordance with the signals generated by said first and second noise-to-signal measuring means to control said first and second adjustable filters;
wherein said first and second adjustable filters each comprise means for varying an input signal by the function $W_0[1+W_1\omega+W_2\omega^2+W_3\omega^3]$, where $\omega$ is measured from the carrier frequency of the input signal and wherein $W_0$, $W_1$, $W_2$ and $W_3$ are weights controlled by signals from said control means.

27. An adaptive correction network as defined in claim 26, wherein said first and second adjustable filters each comprise:
third adder means;
means for applying an input signal to said third adder means;
first linearization means for providing an output signal which varies linearly with the frequency $\omega$ of said input signal and applying this linear output signal to said third adder means;
second linearization means for providing an output signal which varies linearly with the frequency $\omega$ of the output signal from said first linearization means to thereby provide to said third adder means a signal which varies quadratically with the frequency $\omega$ of said input signal; and
third linearization means for providing an output signal which varies linearly with the frequency $\omega$ of the signal from said second linearization means to thereby provide to said third adder means a signal which varies cubically with the frequency $\omega$ of said input signal;
said third adder means adding the output signals from said input applying means, said first linearization means, said second linearization means, and said third linearization means and applying its output to said first or second adder means.

28. An adaptive correction network as defined in claim 27, wherein said linear signal, said quadratic signal, and said cubic signal are each applied to said third adder means through weighting and phase shifting circuits for varying the weights and phases of their respective input signals in accordance with control signals from said control means.

29. An adaptive correction network as defined in claim 28, wherein a weighting and phase shifting circuit is provided in the output line from said third adder means for varying the weight and phase of the output signal from said third adder means in accordance with control signals from said control means.

30. An adjustable filter for use in adaptively removing cross-coupling signal components in a channel under the control of an automatic decoupling system comprising:
first means for generating from an input signal a signal which is constant in magnitude and phase;
second means for generating from said input signal a signal with magnitude and phase terms which vary linearly with the frequency $\omega$ across a predetermined frequency bandwidth, the precise linearity variation with frequency of the magnitude and phase of the generated signal being controlled by control signals from said automatic decoupling system;
third means for generating from said input signal a signal with magnitude and phase terms which vary quadratically with the frequency $\omega$ across said predetermined frequency bandwidth, the precise quadratic variation with frequency of the magnitude and phase of the generated signal being controlled by control signals from said automatic decoupling system;

fourth means for generating from said input signal a signal with magnitude and phase terms which vary cubically with the frequency $\omega$ across said predetermined frequency bandwidth, the precise cubic variation with frequency of the magnitude and phase of the generated signal being controlled by control signals from said automatic decoupling system; and adder means for combining the output signals from said first, second, third and fourth means for application to the channel to be decoupled.

31. An adjustable filter as defined in claim 30, wherein said first means comprises means for applying said input signal to said adder means;

said second means comprises first linearization means for providing an output signal which varies linearly with the frequency $\omega$ of said input signal and applying this linear output signal to said adder means;

said third means comprises the combination of said first linearization means and second linearization means for providing an output signal which varies linearly with the frequency $\omega$ of the output signal from said first linearization means to thereby provide to said adder means a signal which varies quadratically with the frequency $\omega$ of said input signal; and said fourth means comprises the combination of said first linearization means, said second linearization means, and third linearization means for providing an output signal which varies linearly with the frequency $\omega$ of the output signal from said second linearization means to thereby provide to said adder means a signal which varies cubically with the frequency $\omega$ of said input signal.

32. An adjustable filter as defined in claim 31, wherein said linear signal, said quadratic signal, and said cubic signal are each applied to said adder means through weighting and phase shifting circuits for varying the weights and phases of their respective input signals in accordance with control signals from said automatic decoupling system.

33. An adjustable filter as defined in claim 32, wherein a weighting and phase shifting circuit is provided in the output line from said adder means for varying the weight and phase of the output signal from said adder means in accordance with control signals from said automatic decoupling system.

34. An adjustable filter for use in adaptively removing cross-coupling signal components in a channel under the control of an automatic decoupling system comprising:

adder means;

means for applying an input signal to said adder means;

first linearization means for providing an output signal which varies linearly with the frequency $\omega$ of said input signal and applying this linear output signal to said adder means;

second linearization means for providing an output signal which varies linearly with the frequency $\omega$ of the output signal from said first linearization means to thereby provide to said adder means a signal which varies quadratically with the frequency $\omega$ of said input signal; and third linearization means for providing an output signal which varies linearly with the frequency $\omega$ of the signal from said second linearization means to thereby provide to said adder means a signal which varies cubically with the frequency $\omega$ of said input signal;

said adder means adding the output signals from said input applying means, said first linearization means, said second linearization means, and said third linearization means and applying its output to the channel to be decoupled.

35. An adjustable filter as defined in claim 34, wherein said linear signal, said quadratic signal, and said cubic signal are each applied to said adder means through weighting and phase shifting circuits for varying the weights and phases of their respective input signals in accordance with control signals from said automatic decoupling system.

36. An adaptive correction network as defined in claim 35, wherein a weighting and phase shifting circuit is provided in the output line from said adder means for varying the weight and phase of the output signal from said third adder means in accordance with control signals from said automatic decoupling system.

* * * * *